United States Patent [19]

Leonardo

[11] Patent Number: 4,846,106

[45] Date of Patent: Jul. 11, 1989

[54] METHOD AND APPARATUS FOR DETECTING STANDING HEAT IN CATTLE

[75] Inventor: John Leonardo, Modesto, Calif.

[73] Assignee: Cowtronics, Inc., Merced, Calif.

[21] Appl. No.: 917,704

[22] Filed: Oct. 10, 1986

Related U.S. Application Data

[63] Continuation-in-part of Ser. No. 741,838, Jun. 6, 1985, Pat. No. 4,635,587.

[51] Int. Cl.[4] .............................................. A01K 29/00

[52] U.S. Cl. .......................................... 119/1; 128/738

[58] Field of Search .................... 119/1; 128/738, 774; 340/573

[56] References Cited

U.S. PATENT DOCUMENTS

| | | | |
|---|---|---|---|
| 3,844,273 | 10/1974 | Polson | 119/1 X |
| 4,247,758 | 1/1981 | Rodrian | 119/1 X |
| 4,455,610 | 6/1984 | Rodrian | 119/1 X |

*Primary Examiner*—Robert P. Swiatek

*Attorney, Agent, or Firm*—Harris Zimmerman; Howard Cohen

[57] ABSTRACT

A method and apparatus for detecting standing heat in cattle includes an electronic timer module connected to a membrane switch. The module includes a digital timer display, a mounting counter display, a flashing clock signal to indicate activation of the module, as well as audible and visible indicators. A oval-shaped sleeve includes a transparent pocket containing the timer module and membrane switch, and the sleeve is adapted to be adhered to the base of the tail of a cow. The membrane switch is adapted to be actuated by the weight of other cows attempting to mount the cow when in heat. The switch actuates the timer, the mounting counter, and the flashing clock display, and also actuates the audible and visible signals to warn the cattle owner that the cow is in heat, it indicate how long the cow has been in heat, and also how many times the cow has been mounted.

14 Claims, 2 Drawing Sheets

METHOD AND APPARATUS FOR DETECTING STANDING HEAT IN CATTLE

REFERENCE TO RELATED APPLICATION

The present application is a continuation-in-part of U.S. patent application No. 06/741,838, now U.S. Pat. No. 4,635,587, filed June 6, 1985 by John Leonardo.

BACKGROUND OF THE INVENTION

The following United States patents represent the closest known prior art U.S. Pat. Nos.: 3,076,431, 3,158,133, 3,158,134, 3,205,857, 3,297,020, 3,844,273, 3,948,249, 4,239,018, 4,247,758.

Since the advent of artificial insemination techniques, it has been possible to breed cattle to optimize characteristics such as size, milk productivity, disease resistance, and the like. However, although artificial insemination no longer requires the presence of the breeding bull at the time in insemination, it still requires that the farmer or rancher determine the exact time of estrus of a cow, so that the insemination will fertilize the cow. The accurate detection of estrus, or standing heat in cattle, is a problem long recognized but unsolved in the prior art.

A cow comes into heat approximately every 21 days, and then remains in heat for approximately 10 to 12 hours. The cow then ovulates approximately 14 hours after going out of heat. The time of ovulation is the optimum time for artificial insemination. If insemination is successful, the cow will not resume her cycles of heat until she calves at approximately 280 days after insemination. After calving, the ideal situation from the farmers standpoint is to reimpregnate the cow within 45 to 60 days after calving.

However, if it is not known when the cow first entered heat, the timing of the artificial insemination must be approximate, and a significant number of inseminations will fail to produce pregnancy. The farmer must then wait for the next estrus period to again attempt insemination. It is reliably estimated that it cost a dairyman three dollars per day per cow if the cow is not pregnant when it could be pregnant. In an average size diary herd of 400 cows, with an average calving interval of 14 months, accurate determination of standing heat could lower the calving interval to an average of 12.5 months. This savings of 45 days in the pregnancy cycle, multiplied by three dollars per day and by 400 cattle, can result in a net savings of $54,000 per year. Thus it is clear that the accurate determination of estrus onset in cattle is extremely important to dairymen, as well as other cattle breeders.

One type of device known in the prior art for detecting standing heat employs a dye or dye forming chemicals disposed in a frangible pack and secured to the base of the tail of each cow in a herd. With the onset of standing heat in any cow, the other cows will try to mount the one in heat, breaking the frangible pack and mixing and spreading the dye over the animal sufficiently to warn the cattleman that the cow has entered heat at some time since he last saw her. It cannot be determined to within 12-24 hours when estrus has begun, so that the timing of insemination involves too much guesswork and not enough certainty.

Another approach known in the prior art employs a temperature sensor placed in the vagina of the cow, and includes a radio transmitter which emits a signal when the internal temperature rises. This temperature gain may indicate onset of estrus, or may also indicate a fever due to bovine illness. This device has been tested only on virgin heifers at this time, and it is not known if it can be retained by an older cow with a more mature vaginal canal.

Another prior attempt to detect estrus involve a radio transmitter strapped to the leg of each cow and coupled to a pedometer. The theory is that a cow entering heat will take more steps per day than a cow not in heat. The radio transmitter transmits a signal to a computer which analyzes the number of steps taken by the cow each day. However, other factors may determine the number of steps per day. Such things as adverse weather conditions can cause an animal to become agitated and walk more, as can any circumstances that would somehow upset the cow.

A significant failing of all of these methods and apparatus, in addition to the shortcomings noted already, is that they do not determine the exact time that a cow has entered the standing heat cycle, and thus cannot provide the cattle owner with accurate information for optimal timing of artificial insemination.

SUMMARY OF THE PRESENT INVENTION

The present invention generally comprises a method and apparatus for accurately determining the time of onset of estrus in a cow, and for warning the cattle owner that the cow is in heat. Thus the timing of artificial insemination may be accurately determined to maximize the chance of impregnating the cow.

The method and apparatus for detecting standing heat in cattle includes an electronic timer module having a mounting counter and a flashing clock symbol connected to a membrane switch. The module includes a digital time readout display, a count up mounting counter digital display, as well as audible and visible indicators. A salient feature of the invention is the provision of a sleeve adapted to be secured to a cow with an acceptable livestock adhesive. The sleeve is formed of a flexible transparent plastic material, approximately 0.016 inch thickness and double layered to increase durability. The plastic layers are secured to a polyester backing sheet having the same shape and size as the transparent plastic, and joined to a base sheet of nylon mesh material having 0.25 inch holes spaced throughout. The plastic and polyester sheets are secured to the nylon base sheet prefereably with a zig-zag stitch extending about the perimeter of the sleeve.

The sleeve is provided with a slit-like opening extending through the base sheet and polyester sheet and dimensioned to receive the electronic module and membrane switch therethrough. The opening is sealed with suitable tape after the module ans switch are inserted in the sleeve A plurality of vent hole are formed in a distal portion of the transparent plastic layers to prevent moisture accumulation within the sleeve, and to release any air pressure buildup in the sleeve. More importantly, the vents facilitate the transmission of the audible signal from the device to the exterior of the sleeve.

The sleeve is adapted to be adhered by adhesive to the base of the tail of a cow, with the membrane switch disposed on top of the spine of the cow. The membrane switch is thus positioned to be actuated by the weight of other cows attempting to mount the cow when she is in heat. The switch actuates the timer, and also actuates the mounting counter function which advances one count for each time the cow is mounted by another cow. The mounting counter can attain a maximum count of seven, which it retains for 24 hours and then resets automatically. The switch also activates the audible and visible alert signals to warn the cattle owner that the cow is in heat. The timer provides a count up function, so that the digital readout provides an accurate indication of the elapsed time from the onset of estrus. The count up function of the mounting counter indicates the number of times mounting has occurred, so that the dairyman or cattle herder can determine whether the cow is actually in heat or is questionable and requires further checking before insemination is attempted. This information permits an educated determination of the proper time for artificial insemination.

DESCRIPTION OF THE PREFERRED EMBODIMENT

The present invention generally comprises a method and apparatus for determining that a cow is in heat, and also for determining the time of onset of estrus of the cow with relatively high accuracy.

Figure 2:
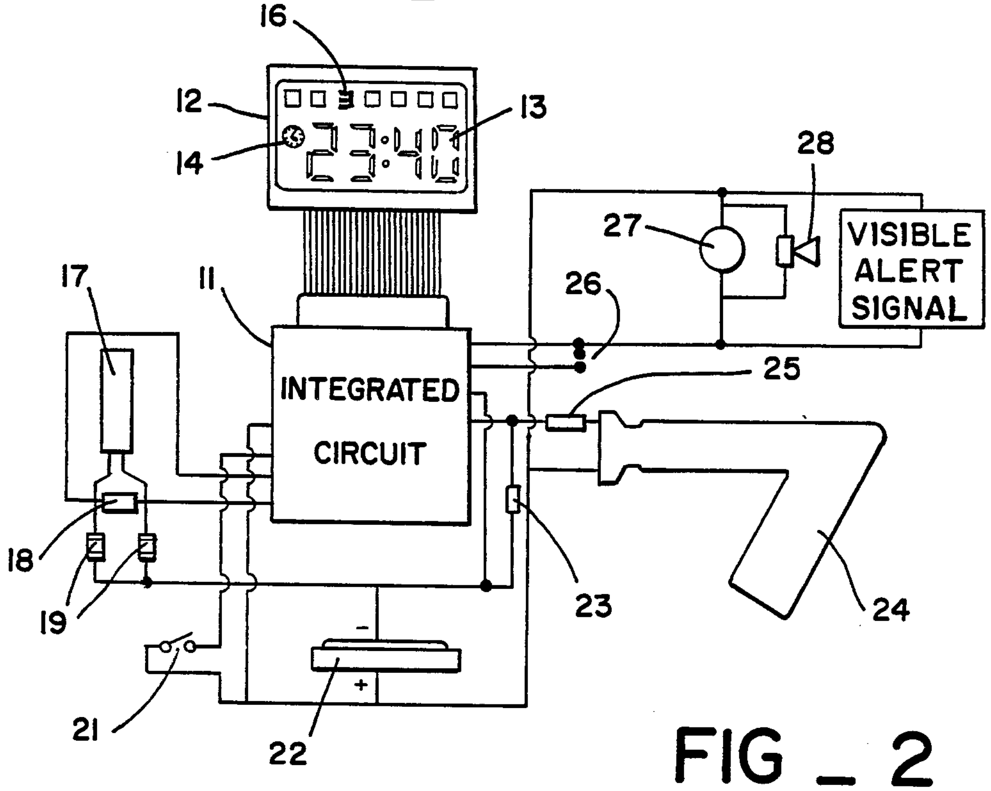
FIG. 2 is a block diagram representation of the circuitry of the electronic module of the present invention
Figure 3:
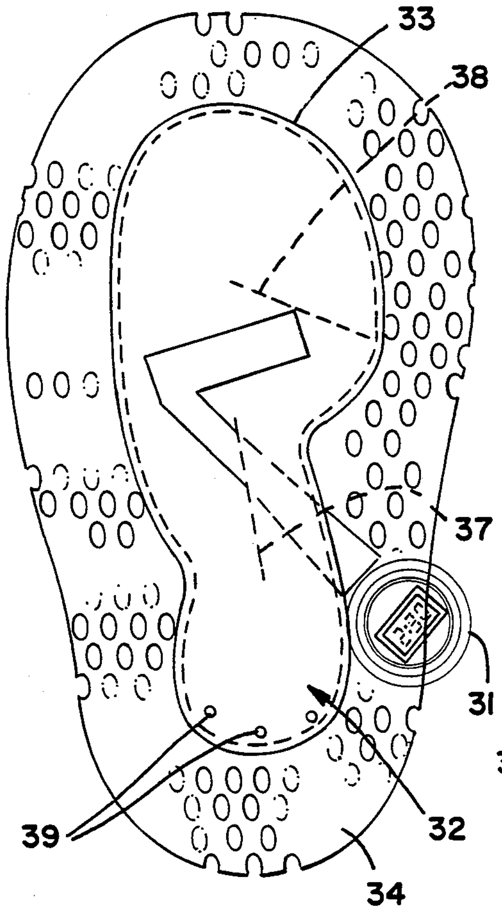
FIG. 3 is a plan view showing the placement of the assembly of FIG. 1 in the sleeve assembly of the present invention.

With regard to FIG. 2, the electronic circuitry of the present invention includes an integrated circuit 11 particularly adapted to provide all the functions required to carry out the method of the invention, as described below. In the preferred embodiment the integrated circuit 11 comprises a customized gate array implemented in a CMOS circuit to minimize power consumption and provide an extremely long useful life for the circuit and its power supply. The gate array incorporates all the program functions, timing functions, counter functions, and switching functions required to operate the invention.

The integrated circuit 11 is connected directly to a liquid crystal display (LCD) 12 which is driven directly by the integrated circuit. The LCD 12 incorporates three distinct and important display features: a count-up, elapsed time digital display 13, indicating hours and minutes; a clock symbol 14 actuatable to flash to indicate that the integrated circuit power has been switched on; and a count-up mounting counter 16 adapted to display the number of times that a cow has been mounted by other cows, as will be explained below. The mounting counter 16, in the preferred embodiment, provides digits 1–7 displayed serially and side-by-side and adapted to be actuated in sequence along the upper margin of the display 12.

The integrated circuit 11 is also connected to a quartz crystal 17 to provide a timing signal for the circuit. Capacitors 19 and 23 are connected in conventional fashion between the crystal 17 and the integrated circuit; together with resistor 18, they trim the frequency of the crystal and provide temperature compensation, as known in the prior art. The power supply comprises a lithium cell 22 connected to one side of an on-off switch 21, the other side of the switch being connected to the integrated circuit 11.

A salient feature of the invention is the provision of a pressure-responsive membrane switch 24 similar to many designs known in the prior art. In the preferred embodiment the switch, provided by the Xymox Division of the W.H. Brady Co., Milwaukee, Wis., comprises alternate layers of polyester fabric and conductive carbon ink adapted to require high pressure to make contact. The contact pressure is provided by a cow mounting the cow equipped with the present invention, as described below. One side of the switch 24 is connected through resistor 25 to the integrated circuit 11, and the other side is connected to the power cell 22.

The invention also includes an electro-acoustic transducer 28 connected between the power cell and the integrated circuit, with a coil 27 connected in parallel with the transducer 28 to enhance the acoustic output, as is known in the prior art. One side of the transducer is also connected to jumper terminals 26, and thence to a terminal of the integrated circuit, to provide an optional alarm function as described in the following specification. It should be noted that the switch 21 is connected between the transducer 28 and the integrated circuit to selectively shut off the alarm signal from the transducer.

Figure 1:
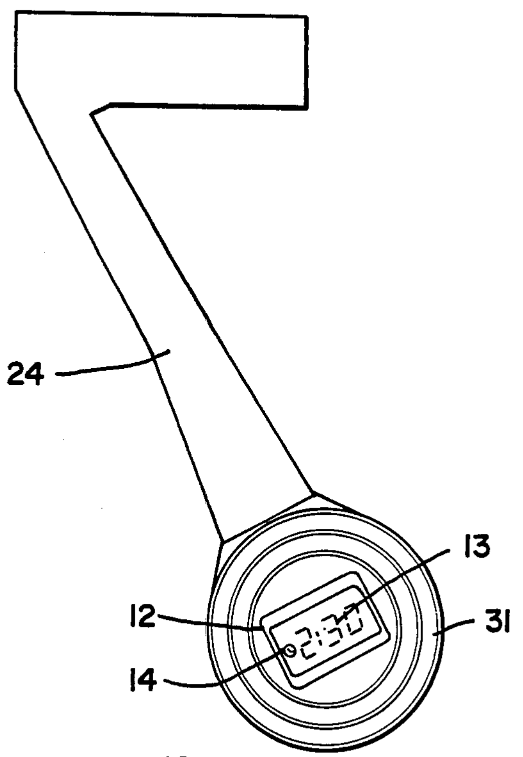
FIG. 1 is a plan view of the membrane switch and electronic module assembly of the present invention.

With regard to FIG. 1, all of the components enumerated in the foregoing, with the exception of the switch 24, are incorporated in a modular housing 31. The housing is disc-like in shape, and is formed of metal or plastic construction adapted to be waterproof, as well as shock resistant and pressure resistant. The electronic components are thus protected from the elements and conditions encountered in use. The membrane switch 24 is connected directly to the modular housing 31, as shown in FIG. 1, with a waterproof junction with the housing. The on-off switch 21 comprises a button disposed in the sidewall of the housing 31, similar to a button actuator commonly used in digital wristwatch construction.

Figure 6:
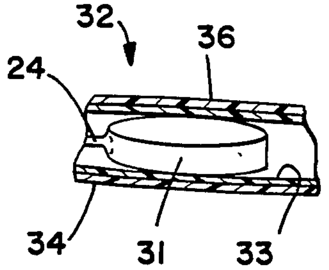
FIG. 6 is an enlarged cross-sectional view of the module and sleeve assembly of the present invention.

A salient feature of the invention is the provision of a sleeve 32 adapted to retain the assembly of the modular housing 31 and the switch 24, and to secure the assembly to a cow with an acceptable livestock adhesive. The sleeve 32 is formed of a flexible transparent plastic material 36, approximately 0.016 inch thickness and double layered to increase durability. The transparent plastic permits visual inspection of the LCD display 12 directly, without removing the assembly from the sleeve. The plastic layers 36 are secured to a polyester backing sheet 33 (FIG. 6) having the same irregular figure eight shape and size as the transparent plastic, and joined to a base sheet 34 of nylon mesh material having 0.25 inch holes spaced throughout. The plastic and polyester sheets are secured to the nylon base sheet preferably with a zig-zag stitch extending about the perimeter of the sleeve. The nylon base material is provided to become enmeshed in the livestock adhesive applied to the cow, and the polyester sheet 33 is provided to form a barrier and protect the module-switch assembly from the adhesive.

Figure 4:
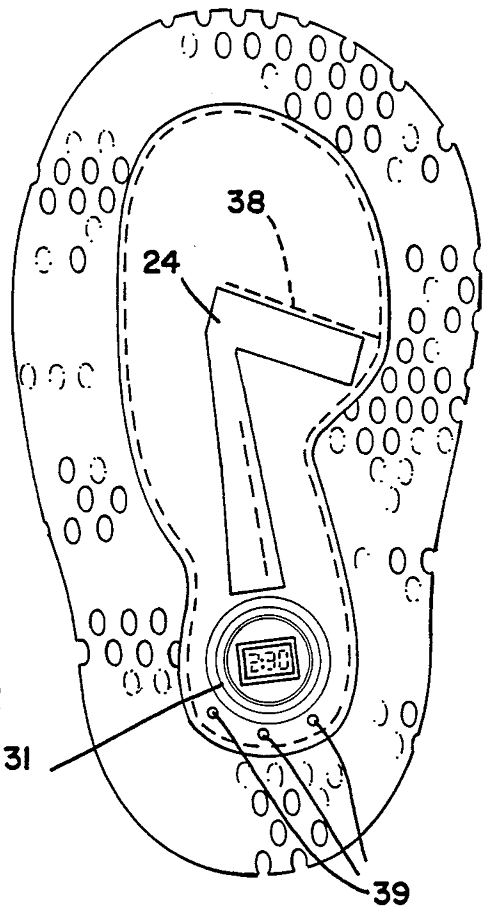
FIG. 4 is a plan view showing the membrane switch and electronic module disposed in the sleeve assembly of the present invention
Figure 5:
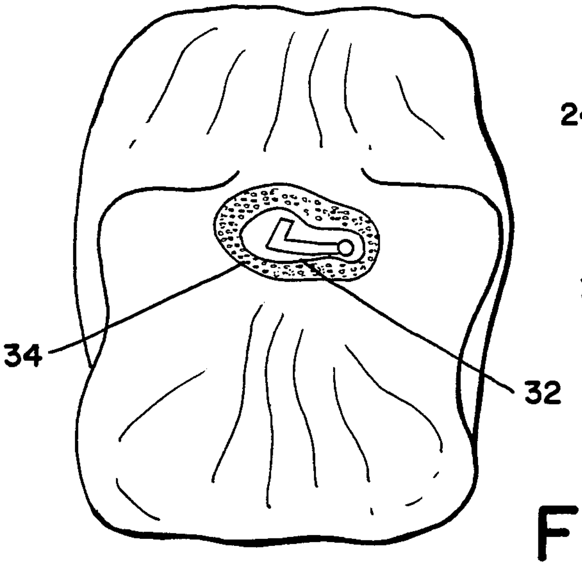
FIG. 5 is a perspective view showing the placement of the sleeve and electronics assembly on a cow.

The sleeve 32 is provided with a slit-like opening 37 extending through the base sheet 34 and polyester sheet 33 and disposed in a medial portion of the irregular figure eight shape of the sleeve. The opening 37 is dimensioned to insert the electronic module and flexible membrane switch therethrough into the interior of the sleeve 32. The opening 37 is sealed with suitable adhesive tape after the module and switch are inserted in the sleeve to protect them from the adhesive. A line of stitching 38 extends through all the layers, and is disposed in a medial portion of the larger end of the irregular figure eight shape of the sleeve. As shown in FIG. 4, the stitching line 38 provides a stop against which the distal end of the membrane switch 24 is abutted when the module and switch are fully inserted in the sleeve. Thus the stitching 38 prevents any significant movement of the assembly in the sleeve.

A plurality of vent holes 39 are formed in the transparent plastic layers 36 at the end of the sleeve which is adapted to receive the modular housing 31. The vent holes prevent moisture accumulation within the sleeve, and release any air pressure buildup in the sleeve. More importantly, the vents facilitate the transmission of the audible signal from the transducer 28 to the exterior of the sleeve.

The sleeve is adapted to be adhered by suitable livestock adhesive to the base of the tail of a cow, with the membrane switch disposed on top of the spine of the cow. It should be noted that the switch is provided with a figure seven configuration, with the longer leg of the switch configuration extending along the length of the sleeve. The sleeve is secured to the cow so that the longer leg of the switch 24 extends over the spine of the cow. The membrane switch is thus positioned to receive a substantial portion of the weight of other cows attempting to mount the cow when she is in heat, and to be actuated by that weight.

To use the present invention, first the button switch 21 and membrane switch 24 are manually actuated for approximately three seconds. The integrated circuit 11 is programmed to recognize these simultaneous signals as a reset command, and the counters and displays are reset to zero. The integrated circuit also acutates the flashing clock symbol 14 to indicate that the unit is operational. The module and membrane switch assembly is then inserted in the sleeve, the opening 37 is closed with adhesive tape, and the sleeve is adhesively secured to the base of the tail of a cow. In the event that the cow enters standing heat, other cows will mount the cow in heat and thus exert substantial pressure on the membrane switch. The membrane switch signals the integrated circuit, which actuates the count-up timer. The count-up timer then begins to display the elapsed time since the first mounting event.

The membrane switch actuation also causes the integrated circuit to actuate the mounting counter function which then displays a "1" in the display area 16. In the event that the cow is mounted subsequently, the display increments one count for each time the cow is mounted by another cow, and the elapsed time indicator continues to count elapsed time. The mounting counter can attain a maximum count of seven, which it retains for 24 hours and then resets automatically.

The membrane switch activation also causes the integrated circuit to activate the transducer 28 to emit a loud tone signal to warn the cattle owner that the cow is in heat. This signal continues until the cattle owner presses the button switch 21, which can be accomplished directly through the sleeve, thereby stopping the alarm while maintaining the elapsed time counter function and the mounting counter function in an active state. The timer provides a count up function, so that the digital readout provides an accurate indication of the elapsed time from the onset of estrus. The count up function of the mounting counter indicates the number of times mounting has occurred. so that the dairyman or cattle herder can determine whether the cow is actually in heat or is questionable and requires further checking before insemination is attempted. This information permits an educated determination of the proper time for artificial insemination.

After insemination, if the cow has been diagnosed as pregnant, the module and switch assembly may be removed from the sleeve secured to the cow, and reinserted in another sleeve. The new assembly is then ready to be adhered to another cow for further use. It should be noted that the power cell is continuously connected to the circuitry and is ready for use. Because of the selection of a lithium power cell, and the use of low power CMOS technology, a power cell will remain useful for several years, and the device may be reused many times.

I claim:

1. An apparatus for detecting the onset of estrus in a cow, comprising:

a pressure responsive switch means disposed to be actuated by mounting of the cow, timer means connected to be activated by said switch means in count up fashion, mounting counter means connected to be activated by said switch means in count up fashion to count the number of times the cow has been mounted, digital display means connected to said timer means and said mounting counter means and adapted to display directly the elapsed time after mounting of the cow and the number of times the cow has been mounted, signaling means connected to said switch means to emit a warning signal in response to activation of said timer means, and means for securing said switch means, said timer means, said mounting counter means, said digital display means, and said signaling means to the cow to provide direct indication from the cow of the elapsed time since initial mounting and the number of times the cow has been mounted.

2. The apparatus of claim 1, further including sleeve means for securing and supporting said switch means, said timer means, said mounting counter means, said digital display means, and said signaling means on the cow.

3. The apparatus of claim 2, wherein said sleeve means includes a flexible base member adapted to be adhered over the spine of the cow adjacent to the base of the tail thereof.

4. The apparatus of claim 3, further including a sealable pocket joined to said base member and adapted to retain said switch means, said timer means, said mounting counter means, said digital display means, and said signaling means.

5. The apparatus of claim 1, wherein said switch means includes a flexible membrane switch.

6. The apparatus of claim 1, further including a modular housing, said timer means, said mounting counter means, said digital display means, and said signaling means being secured in said modular housing.

7. The apparatus of claim 6, wherein said base member includes a mesh material adapted to be adhered to livestock adhesive applied to the cow, and a pocket formed on said base member of transparent plastic material to retain said housing and provide direct visualization of said digital display means.

8. The apparatus of claim 7, wherein said digital display means includes a clock symbol adapted to flash to indicate operation of the apparatus.

9. The apparatus of claim 8, further including on-off switch means connected to selectively disable said signaling means while permitting continued operation of said timer means, said mounting counter means, and said digital display means.

10. The apparatus of claim 9, further including a plurality of vent holes in said pocket to facilitate broadcast of audible signals from said signaling means.

11. The apparatus of claim 9, further including an opening in said pocket to facilitate emplacement of said timer means, said digital display means, said counter means, said switch means, and said signaling means in said pocket.

12. The apparatus of claim 8, wherein said switch means is disposed in said pocket to be impinged upon by the weight of another cow mounting the cow equipped with the apparatus.

13. The apparatus of claim 1, wherein said signaling means includes audible and visible warning devices.

14. A method for determining the onset and time of onset of estrus in a cow, comprising the steps of:

providing a timer module having a count up timer, a mounting counter, a digital display, and a local signaling device, providing a membrane switch connected to actuate said timer module, securing said membrane switch adjacent over the spine of a cow adjacent to the base of the tail of the cow, with the timer module secured directly thereto, said membrane switch being disposed to be actuated by mounting of the cow by other cows in response to onset of estrus, said membrane switch activating said timer module to indicate directly from the cow the elapsed time after initial mounting of the cow and the number of times the cow has been mounted, and to activate said local signaling device to emit a warning of onset of estrus in the cow directly from the cow.

* * * * *